United States Patent
Marko et al.

(10) Patent No.: US 7,274,327 B2
(45) Date of Patent: Sep. 25, 2007

(54) METHOD AND APPARATUS FOR DETERMINING LOCATION IN A SATELLITE COMMUNICATION SYSTEM

(75) Inventors: Paul Marko, Boca Raton, FL (US); Craig Wadin, Sunrise, FL (US); Richard Andrew Michalski, Frederick, MD (US)

(73) Assignee: XM Satellite Radio, Inc., Washington, DC (US)

( * ) Notice: Subject to any disclaimer, the term of this patent is extended or adjusted under 35 U.S.C. 154(b) by 0 days.

(21) Appl. No.: 10/039,348

(22) Filed: Dec. 31, 2001

(65) Prior Publication Data

US 2003/0122705 A1 Jul. 3, 2003

(51) Int. Cl.
*H04B 7/185* (2006.01)
*G01S 5/02* (2006.01)

(52) U.S. Cl. .................... 342/357.01; 342/352
(58) Field of Classification Search ............ 342/357.01, 342/357.06, 357.09, 357.1, 352; 455/12.1, 455/13.1, 13.2; 701/207, 213
See application file for complete search history.

(56) References Cited

U.S. PATENT DOCUMENTS

| | | | | |
|---|---|---|---|---|
| 4,193,073 A | * | 3/1980 | Kohnen | 343/6 R |
| 4,346,470 A | * | 8/1982 | Alvarez et al. | 370/324 |
| 4,574,379 A | * | 3/1986 | Eng et al. | 370/104 |
| 4,916,455 A | * | 4/1990 | Bent et al. | 342/457 |
| 5,331,329 A | * | 7/1994 | Volkov et al. | 342/357 |
| 5,510,801 A | * | 4/1996 | Engelbrecht et al. | 342/457 |
| 5,809,397 A | * | 9/1998 | Harthcock et al. | 455/13.2 |
| 5,815,538 A | * | 9/1998 | Grell et al. | 375/356 |
| 6,054,950 A | * | 4/2000 | Fontana | 342/463 |
| 6,771,629 B1 | * | 8/2004 | Preston et al. | 370/337 |
| 2002/0037732 A1 | * | 3/2002 | Gous et al. | 455/502 |

* cited by examiner

*Primary Examiner*—Dao Phan
(74) *Attorney, Agent, or Firm*—Akerman Senterfitt & Pablo Meles

(57) ABSTRACT

A receiver unit (400) capable of determining its approximate location using a first and a second satellite transmission source (12 & 14) and, a first terrestrial transmission source (18) includes a receiver (402) and decoder (450) for receiving and decoding a first synchronization pulse from the first satellite, a second synchronization pulse from the satellite signal, and a third synchronization pulse from the terrestrial source. The receiver unit further includes a counter (412) for measuring a first delay between the first synchronization pulse and the second synchronization pulse and for measuring a second delay between one of the first synchronization pulse or the second synchronization pulse and the third synchronization pulse. The receiver unit further includes a processor (421) for determining an east-west constant delay line based on the first delay and for determining a north-south constant delay line based on the second delay.

21 Claims, 8 Drawing Sheets

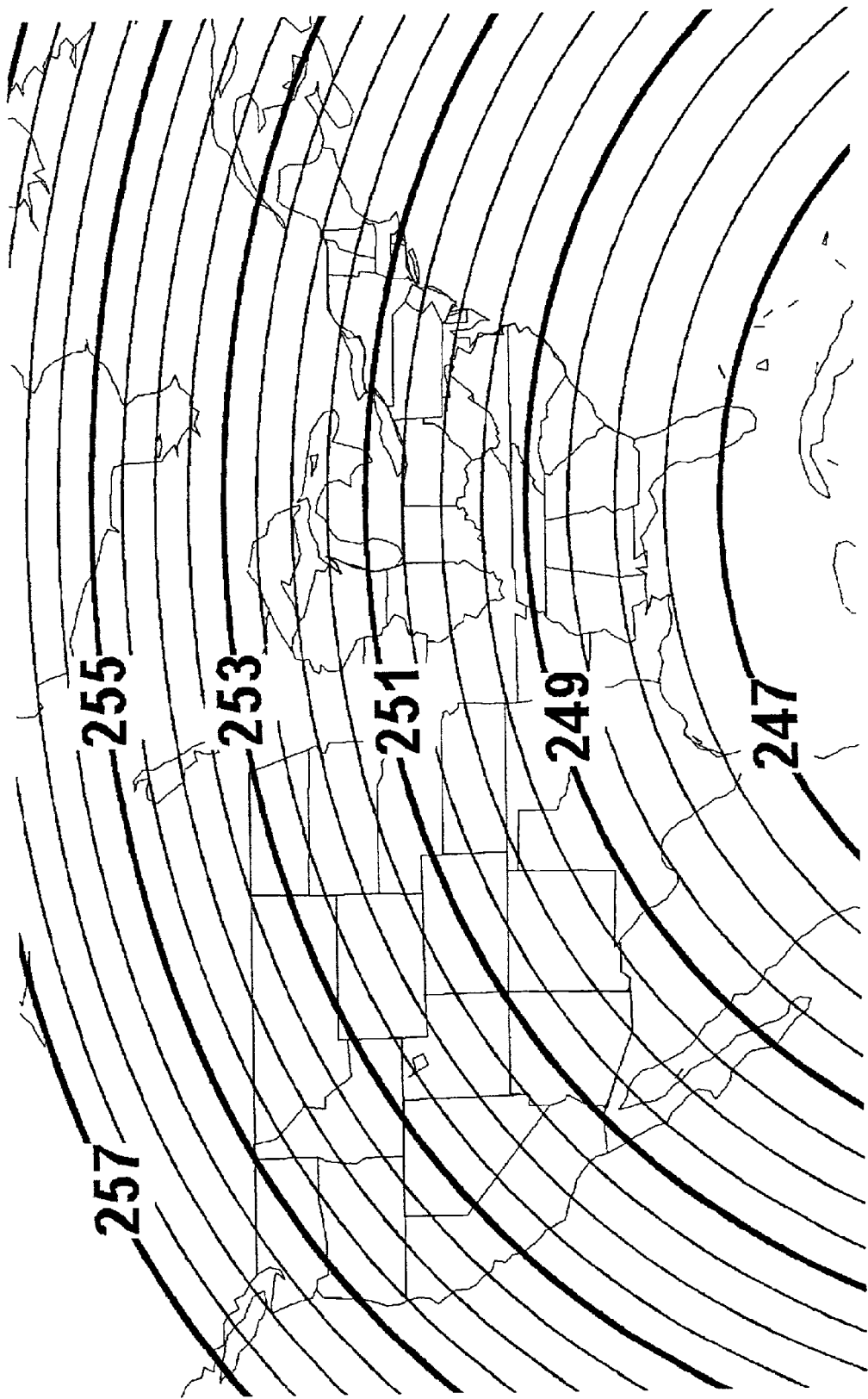

FIG. 5

SYNC PULSE OUTPUT TIMING FROM SATELLITE & TERRESTRIAL ARMS

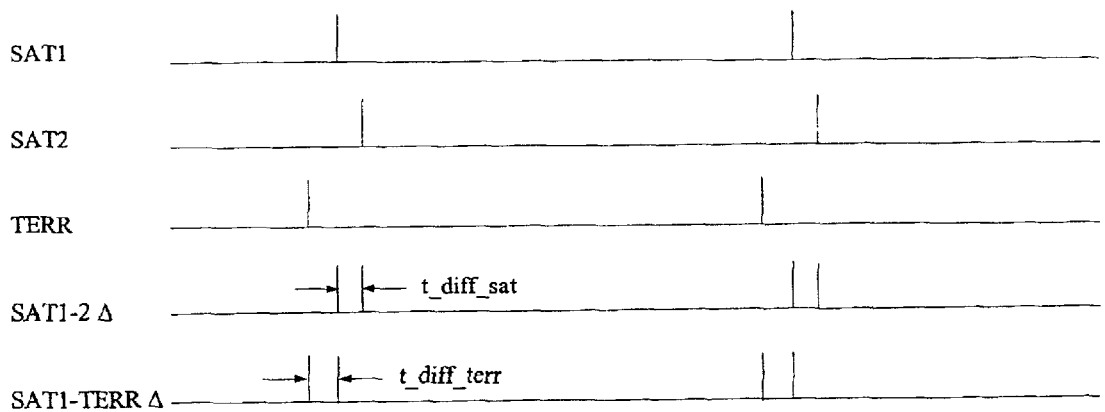

FIG. 6

CHANNEL DECODER RADIO LOCATION REGISTERS

X = 0   Sat1 early or no offset

X = 1   Sat2 early

0000 hex = no offset
XXXX hex = Total 5.98 MHz clock cycles between Sat1 & Sat2 pulses
FFFF hex = Both Sat Sync Pulses not present

0000 hex = no offset
XXXX hex = Total 1.495 MHz clock cycles less 20 mS or 29,900 cycles
between Terr & Sat1 Sync pulses
FFFF hex = Sat1 and/or Terr Sync Pulse not present

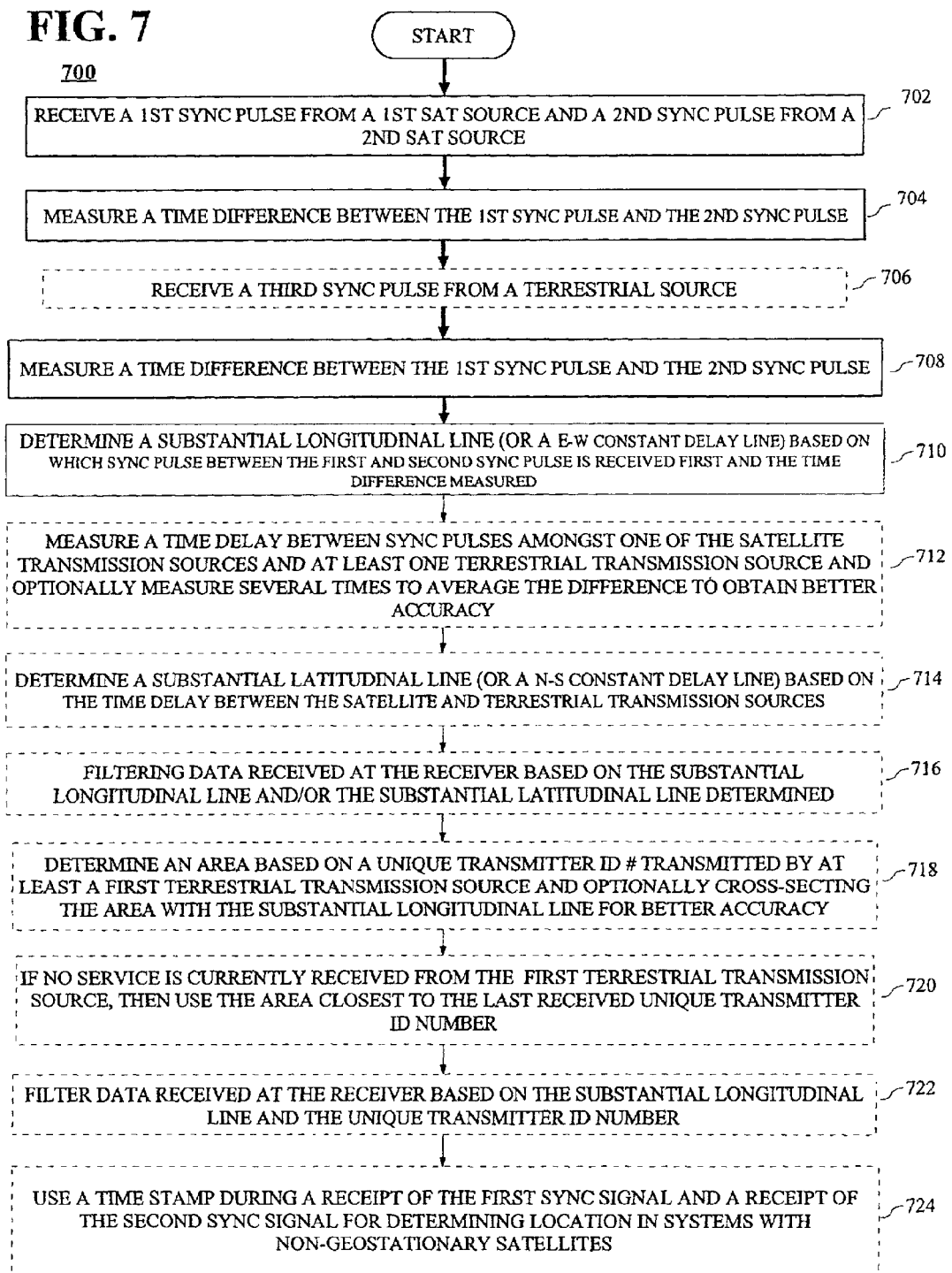

METHOD AND APPARATUS FOR DETERMINING LOCATION IN A SATELLITE COMMUNICATION SYSTEM

CROSS-REFERENCE TO RELATED APPLICATIONS

Application Ser. No. 10/039,324 entitled: "METHOD AND APPARATUS FOR CONTENT BLOCKING", concurrently filed on the same date.

FIELD OF THE INVENTION

The invention relates generally to a method and apparatus for location determination, and more particularly to a method and apparatus for determining location in a communication using both terrestrial and satellite transmission sources.

BACKGROUND OF THE INVENTION

Satellite radio operators provide digital quality radio broadcast services covering the entire continental United States. These services offer approximately 100 channels, of which 50 or more channels in a typical configuration will provide music with the remaining stations offering news, sports, talk and data channels.

Satellite radio has the ability to improve terrestrial radio's potential by offering a better audio quality, greater coverage and fewer commercials. Accordingly, in October of 1997, the Federal Communications Commission (FCC) granted two national satellite radio broadcast licenses. The FCC allocated 25 megahertz (MHZ) of the electro-magnetic spectrum for satellite digital broadcasting, 12.5 MHz of which are owned by Sirius Satellite Radio and 12.5 MHz of which are owned by the assignee of the present application "XM Satellite Radio Inc."

The system plan for each licensee presently includes transmission of substantially the same program content from two or more geosynchronous or geostationary satellites to both mobile and fixed receivers on the ground. In urban canyons and other high population density areas with limited line-of-sight (LOS) satellite coverage, terrestrial repeaters broadcast the same program content in order to improve coverage reliability. Some mobile receivers simultaneously receive signals from two satellites and one terrestrial repeater for combined spatial, frequency and time diversity, which provides significant mitigation of multipath interference and addresses reception issues associated with blockage of the satellite signals. In accordance with XM Satellite Radio's unique scheme, the 12.5 MHZ band is split into 6 slots. Four slots are used for satellite transmission. The remaining two slots are used for terrestrial reinforcement.

In accordance with the XM frequency plan, each of two geostationary Hughes 702 satellites transmit identical program content. The signals transmitted with QPSK modulation from each satellite (hereinafter satellite 1 and satellite 2) are time interleaved to lower the short-term time correlation and to maximize the robustness of the signal. For reliable reception, the LOS signals transmitted from satellite 1 are received, reformatted to Multi-Carrier Modulation (MCM) and rebroadcast by terrestrial repeaters. The assigned 12.5 MHZ bandwidth (hereinafter the "XM" band) is partitioned into two equal ensembles or program groups A and B. Each ensemble is transmitted by each satellite on a separate radio frequency (RF) carrier. With terrestrial repeaters transmitting an A and a B signal, six total slots are provided, each slot being centered at a different RF carrier frequency.

Although there are satellite systems such as Loran and the Global Positioning System that provide location finding capabilities, there is no current location finding capability in such a system as described above where only two satellites are used in combination with terrestrial repeaters. Thus, a need exists for a method and apparatus of determining location in a communication system having at least two satellite transmission sources and optional terrestrial transmission sources.

SUMMARY OF THE INVENTION

In a first aspect of the present invention, a method of determining location at a receiver in a communication system having at least a first and a second satellite transmission source and at least a first terrestrial transmission source in communication with at least the first or the second satellite transmission source is described. The method comprises the steps of receiving a first synchronization pulse from the first satellite transmission source and receiving a second synchronization pulse from the second satellite transmission source, measuring a time difference between the first synchronization pulse and the second synchronization pulse, and determining a substantial longitudinal line based on which synchronization pulse between the first and second synchronization pulse is received first at the receiver and the time difference measured.

In a second aspect of the present invention, a receiver unit capable of determining its approximate location using at least a first and a second satellite transmission source and, if available, at least a first terrestrial transmission source is described. The receiver unit preferably comprises a receiver for receiving a first signal from the first satellite transmission source, a second signal from the second satellite transmission source, and a third signal from the at least first terrestrial transmission source. The receiver unit further comprises a decoder for decoding a first synchronization pulse from the first signal, a second synchronization pulse from the second signal, and a third synchronization pulse from the third signal, a counter for measuring a first delay between the first synchronization pulse and the second synchronization pulse and for measuring a second delay between one of the first synchronization pulse or the second synchronization pulse and the third synchronization pulse, and a processor for determining an first constant delay line based on the first delay and for determining a second constant delay line based on the second delay.

In a third aspect of the present invention, a satellite and terrestrial based location system comprises at least a first satellite and a second satellite, transmitting a first signal containing a first synchronization pulse and a second signal containing a second synchronization pulse respectively, at least a first terrestrial repeater for receiving at least the first signal or the second signal, wherein the first terrestrial repeater transmits a third synchronization pulse, and at least a receiver unit. The receiver unit preferably comprises a receiver for receiving the first signal, the second signal, and the third signal, a decoder for decoding the first synchronization pulse from the first signal, the second synchronization pulse from the second signal, and the third synchronization pulse from the third signal, a counter for measuring a first delay between the first synchronization pulse and the second synchronization pulse and for measuring a second delay between one of the first synchronization pulse or the second synchronization pulse and the third synchronization pulse, and a processor for determining an first constant delay line based on the first delay and for determining a second constant delay line based on the second delay.

In a fourth aspect of the present invention, a satellite and terrestrial based location system comprises at least a first satellite and a second satellite, transmitting a first signal containing a first synchronization pulse, which includes a time stamp indicating its time of transmission and a second signal containing a second synchronization pulse respectively, an accurate clock in a receiver which may or may not receive updates using a local terrestrially originating broadcast time standard, wherein the accuracy of the accurate clock is sufficient to determine the delay of the synchronization pulse from the first satellite, and at least a receiver unit.

A receiver unit in accordance with this fourth aspect would preferably comprise a receiver for receiving the first signal, the second signal, and optionally an update signal from a terrestrial transmission source, a decoder for decoding the first synchronization pulse from the first signal, the second synchronization pulse from the second signal, and a counter for measuring a first delay between the first synchronization pulse and the second synchronization pulse and for measuring a second delay between one of the first synchronization pulse or the second synchronization pulse and the time obtained from the internal clock, and a processor for determining an first constant delay line based on the first delay and for determining a second constant delay line based on the second delay.

BRIEF DESCRIPTION OF THE DRAWINGS

FIG. 3B is a coverage map showing substantial latitudinal lines or second constant delay lines reflecting relative delays between a satellite signal and a terrestrial signal in accordance with the present invention.

FIG. 5 is a timing diagram illustrating a sync pulse output from the satellite and terrestrial transmission sources in accordance with the present invention.

FIG. 6 is a diagram illustrating channel decoder radio location registers in accordance with the present invention.

FIG. 7 is a flowchart illustrating a method in accordance with the present invention.

DETAILED DESCRIPTION OF THE DRAWINGS

Figure 1:
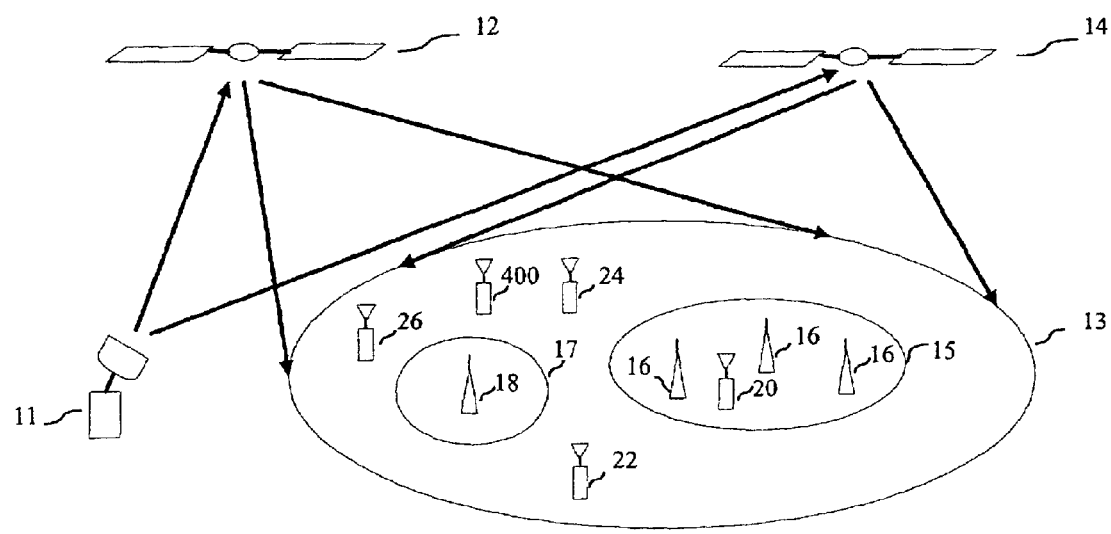
FIG. 1 illustrates a satellite digital audio radio service system architecture in accordance with the present invention.

Referring to FIG. 1, satellite radio operators are providing digital radio service to the continental United States in various different communication system configurations. Briefly, the service provided by XM Satellite Radio includes a satellite X-band uplink 11 to two satellites (12 and 14) which provide frequency translation to the S-band for re-transmission to radio receivers (400, 20, 22, 24, and 26) on earth within the coverage area 13. The satellites provide for interleaving and spatial diversity. Radio frequency carriers from one of the satellites are also received by terrestrial repeaters (16 and 18). The content received at the repeaters are also "repeated" at a different S-band carrier to the same radios (20) that are within their respective coverage areas (15 and 17). These terrestrial repeaters facilitate reliable reception in geographic areas where LOS reception from the satellites is obscured by tall buildings, hills, tunnels and other obstructions. The signals transmitted by the satellites 12 and 14 and the repeaters are received by SDARS receivers 20–26 and SDARS receiver 400. As depicted in FIG. 1, the receivers 20–26 and receiver 400 may be located in automobiles, handheld or stationary units for home or office use. The SDARS receivers are designed to receive one or both of the satellite signals and the signals from the terrestrial repeaters and combine or select one of the signals as the receiver output.

Figure 2:
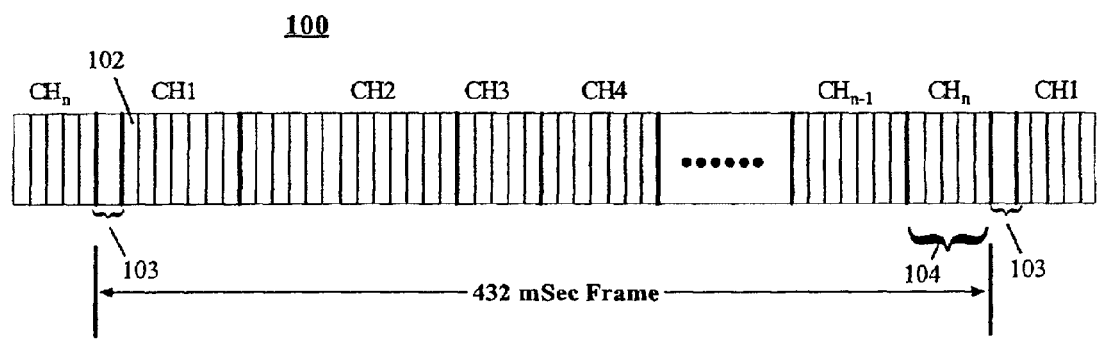
FIG. 2. is a diagram illustrating a representative bit stream in a frame format for distributing data in accordance with the present invention.

Referring to FIG. 2, a plurality of communication resource channels (Channel 1 through n) are shown in accordance with the present invention. In this instance, the over-the-air protocol frame format 100 of the XM Satellite Radio system is shown. This frame format 100 is based on a 432 millisecond frame as shown in FIG. 2 where each frame is subdivided into 8 kilobit per second sub-channels 102. These sub-channels 102 can be dynamically grouped to form higher bit rate payload channels 104. The payload channel or communication resource 104 provides the necessary bandwidth to transport a high-quality digital audio signal to the listener as well as other data as will become more apparent. When a listener changes channels, a receiver in accordance with the present invention simply extracts a different payload channel from the frame 100. It should be noted that each receiver in the XM Satellite System has a unique identifier allowing for the capability of individually addressing each receiver over-the-air to enable or disable services or to provide custom applications such as individual data services or group data services.

Figure 3A:
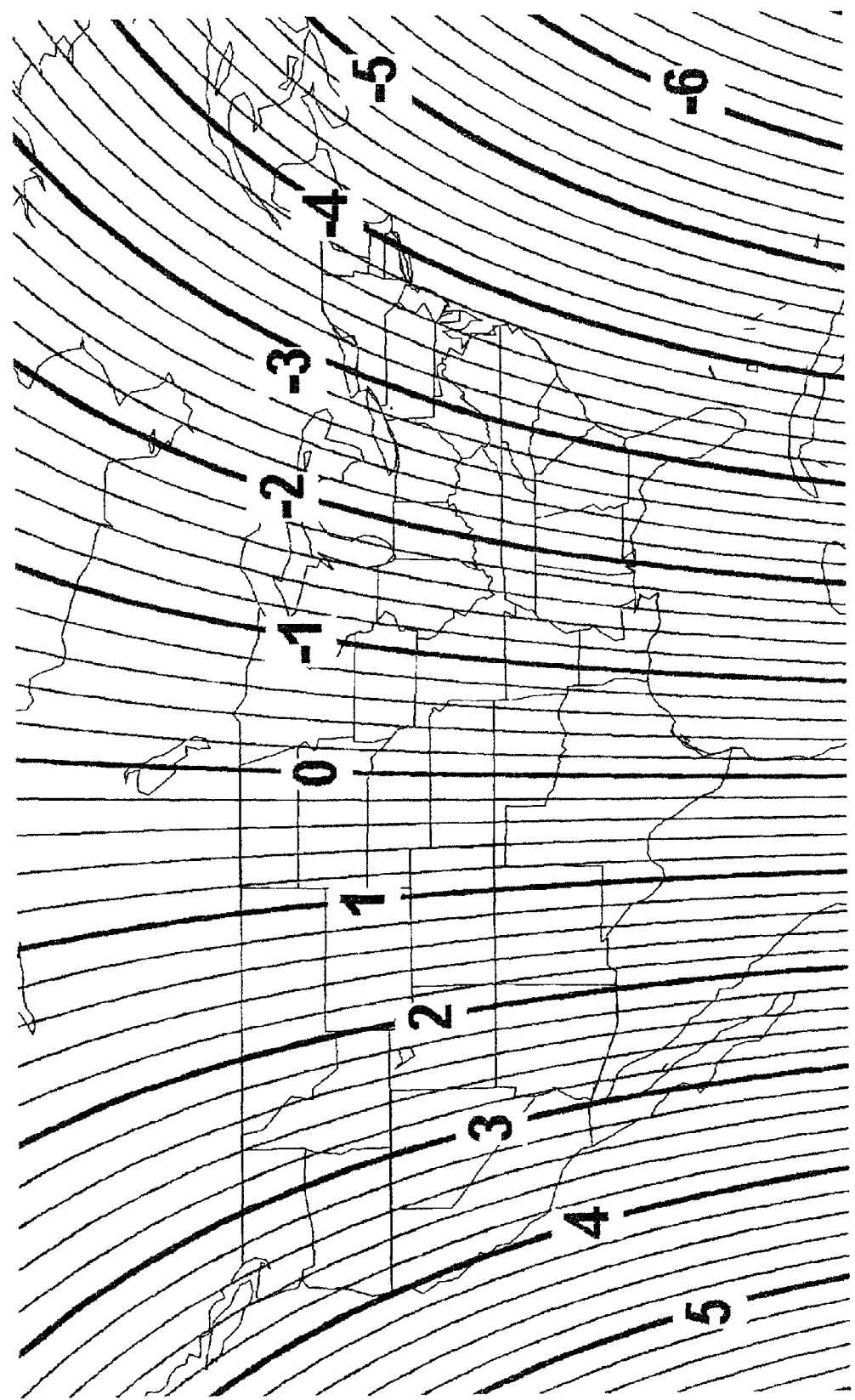
FIG. 3A is a coverage map showing substantial longitudinal lines or first constant delay lines reflecting a differential delay between signals from at least two satellite in accordance with the present invention.

Referring to FIG. 3A, a coverage map 300 illustrates substantial longitudinal lines or first or "east-west" constant delay lines reflecting a differential delay between at least two satellite signals in accordance with the present invention. This differential delay or first delay is preferably determined by noting the differences in synchronization pulses from at least two satellites received at the mobile receiver, although the present invention is not necessarily limited to using synchronization pulses for determining such differential delay. Other methods including the use of at least one time stamp from the satellite signals and an absolute time reference obtained at the receiver could also determine such differential delays. As proposed in this embodiment of the present invention, a negative differential delay (−1 to −5) would reflect a signal received on the east side of the zero ("0") differential delay line and a positive differential delay (1 to 5) would reflect a signal received on the west side of the zero differential delay line.

In order to control the geographic position of the zero ("0") differential delay line, the independent satellite signal delays at the uplink are adjusted to compensate for the different signal propagation time to and from each satellite.

Referring to FIG. 3B, a coverage map 301 is shown illustrating substantial latitudinal lines or second or "north-south" constant delay lines reflecting a relative delay between signals received from a satellite (such as satellite 14 of FIG. 1) and signals received from a terrestrial repeater (such as repeater 16 of FIG. 1) to a receiver (such as receiver 20 of FIG. 1) in accordance with the present invention. In other words, this second delay approximates the delay between signals received from a satellite and a terrestrial repeater. In one embodiment, this second delay can be determined as the difference in synchronization pulses between a first satellite and a terrestrial repeater. In another embodiment the second delay can be determined by noting the difference in time stamps associated with particular content for the respective signals for example. As shown, as the receiver generally moves further away from the satellite, the constant delay increases. In this instance, the constant delay increases as the mobile receiver moves north. South Florida and parts of Mexico are on a "near" second constant delay line 247 while parts of North Carolina and north Texas are on a "further" second constant delay line 249. Likewise parts of New York and Colorado are on "yet a further" second constant delay line 251 while the other second constant delay lines 253, 255, and 257 are each progressively further north with associated relative longer delays.

In order to control the geographic position of the delays measured between the satellite and terrestrial repeater synchronization pulses, at each repeater the transmission signal delay is set according to its geographic position.

Figure 3C:
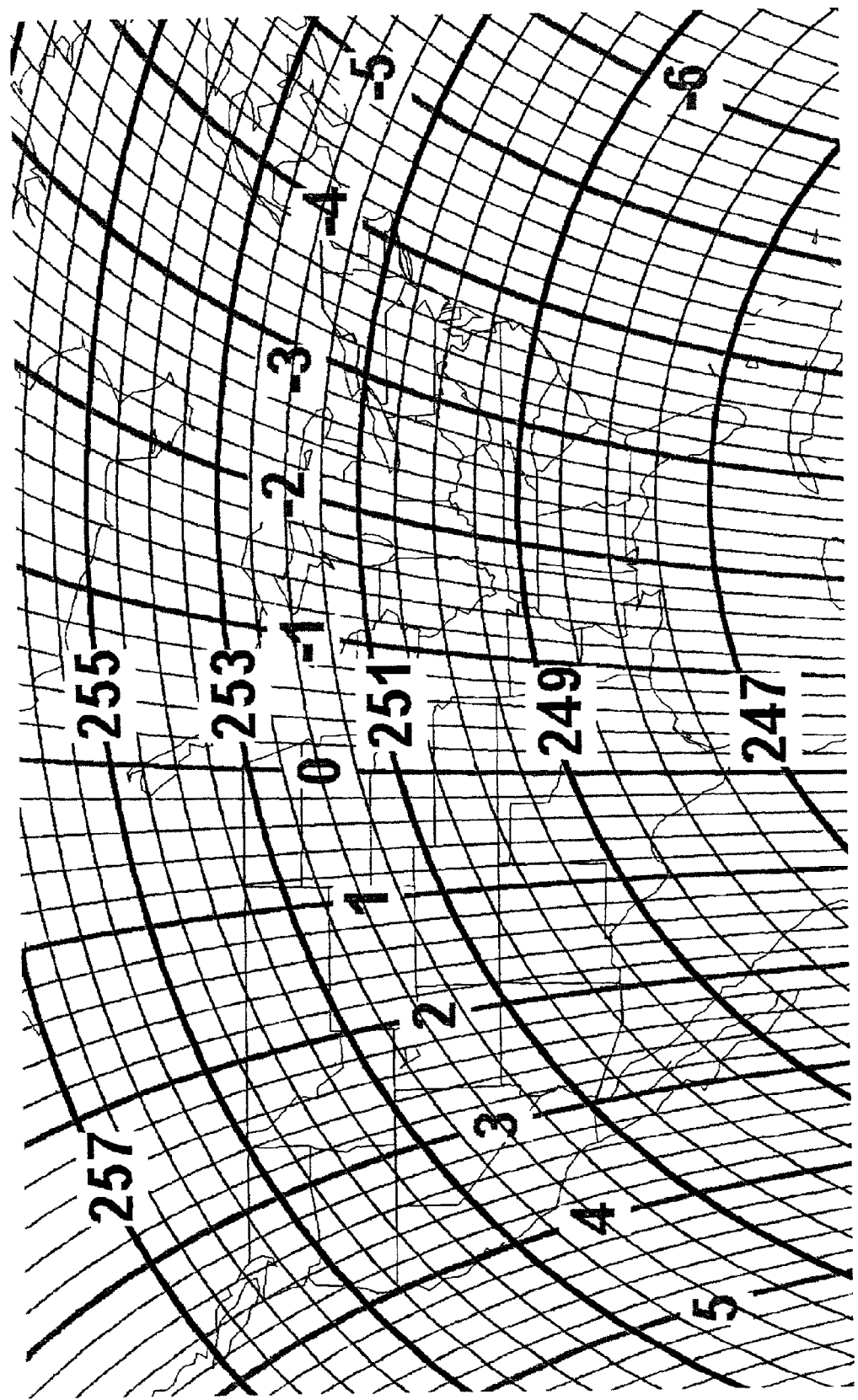
FIG. 3C is a coverage map illustrating an overlap of the maps of FIGS. 3A and 3B in accordance with the present invention.

Overlapping a first delay line of FIG. 3A and a second delay line of FIG. 3B would allow a receiver receiving such satellite and terrestrial repeater signals to determine its location into the narrow "quadrants" illustrated in the coverage map 350 of FIG. 3C.

Although there are only a few constant delay lines shown in FIGS. 3A–C, it should be understood that there could theoretically be an infinite number of these delay lines in both directions (east-west and north-south) in accordance with the scope of the present invention. The time difference between a first synchronization pulse from a first satellite and a second synchronization pulse from a second satellite determines the substantial longitudinal lines or the first or east-west constant delay lines. Also, the determination of which synchronization pulse is received first helps determine if these imaginary lines should lay east or west of the center constant delay line 0 (where no difference is measured between the first and second synchronization pulses). The second constant delay lines or substantial latitudinal lines in FIG. 3B correspond to time delays between a satellite and terrestrial transmission sources. Using the determined cross-section of the substantial latitudinal lines with the substantial longitudinal lines (or the east-west constant delay line with the north-south constant delay line) a location can be determined with an approximate east-west accuracy of ¼ mile and a north-south accuracy of approximately 6 miles. Using terrestrial transmitter identification or area numbers could also further lead to greater accuracy or serve as another avenue of determining location in combination with either the substantial longitudinal lines or the substantial latitudinal or both. Embedding information in the satellite transmission on the satellite position variation within the orbital slot could also lead to greater accuracy of location determination. The receiver would utilize this information to remove differential delay errors from the measured synchronization pulses due to the round trip signal propagation time delta introduced by the satellite position error.

Figure 3D:
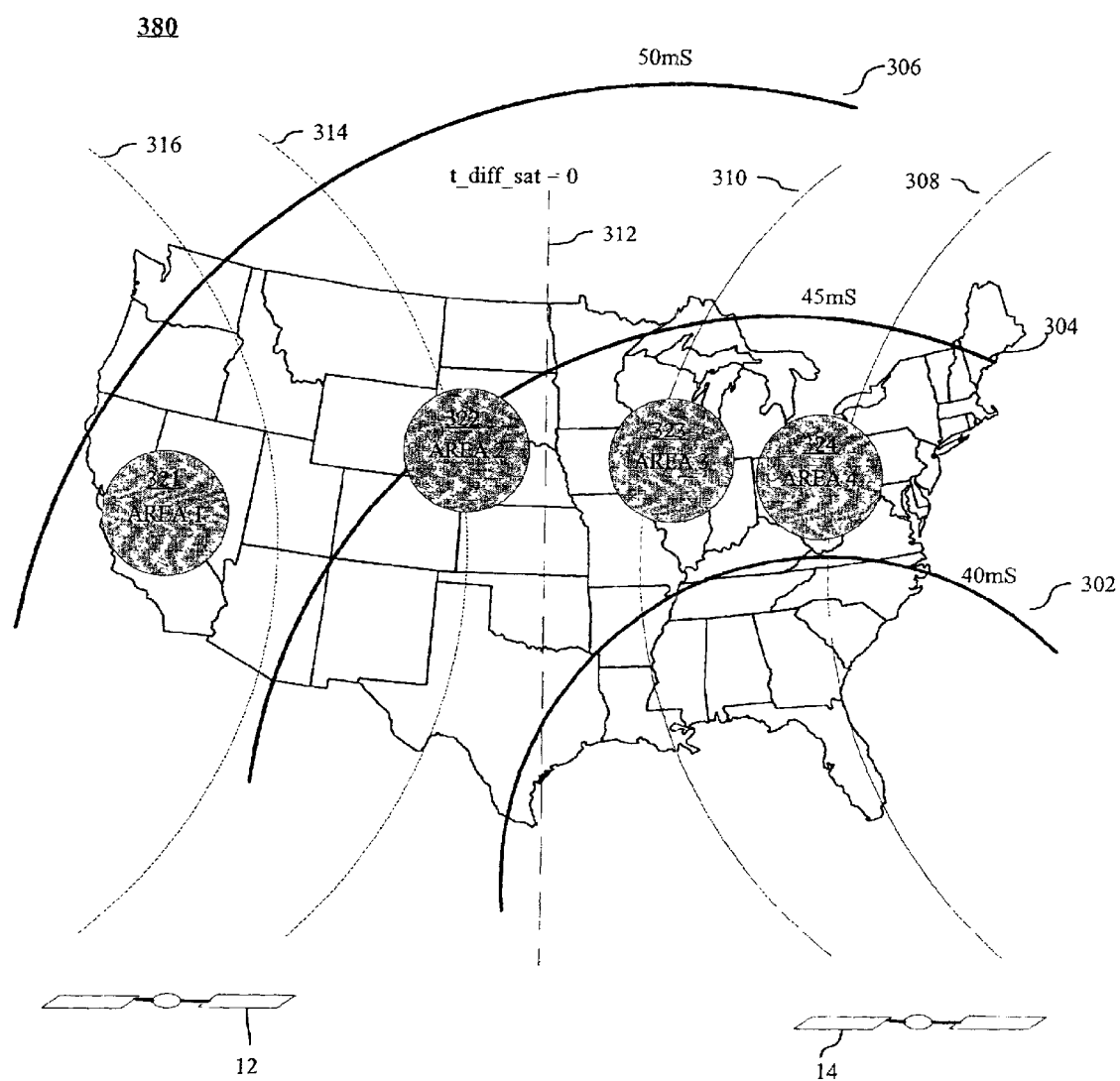
FIG. 3D is another coverage map showing substantial longitudinal lines or east-west constant delay lines, substantial latitudinal lines or north-south constant delay lines, and areas defined by terrestrial transmitter IDs in accordance with another aspect of the present invention.

Referring to FIG. 3D, a coverage map 380 shows substantial latitudinal lines or north-south constant delay lines (302, 304, and 306) in accordance with the present invention. In addition, the coverage map illustrates 4 different areas (321, 322, 323, and 324) corresponding to four different terrestrial transmission zones that could be distinguished using unique repeater delay settings. In this application, the location of a receiver unit could be narrowed to a specific terrestrial transmission zone using only a single time delay measurement between the synchronization pulse from one satellite and the synchronization pulse from the terrestrial repeater. This is accomplished in a receiver unit by matching this measured delay to a unique predetermined delay range associated with a specific repeater zone.

Figure 4:
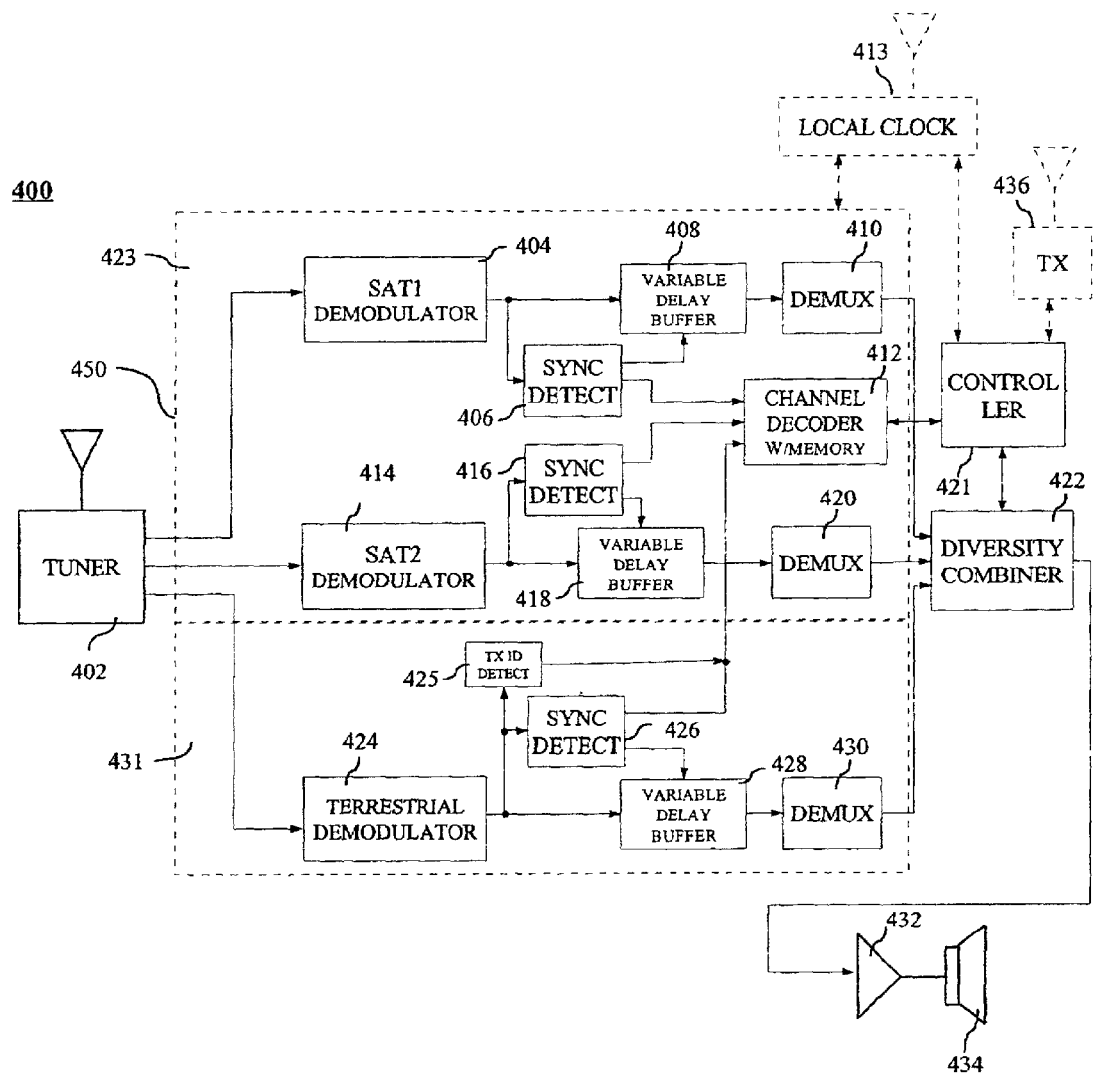
FIG. 4 is a block diagram illustrating a receiver unit in accordance with the present invention.

Referring to FIG. 4, a receiver unit 400 is shown capable of determining its approximate location using at least a first and a second satellite transmission source and, if available, at least a first terrestrial transmission source. The receiver unit 400 preferably comprises a receiver 402 for receiving a first signal from the first satellite transmission source, a second signal from the second satellite transmission source, and a third signal from at least the first terrestrial transmission source, a decoder 450 for decoding a first synchronization pulse from the first signal, a second synchronization pulse from the second signal, and a third synchronization pulse from the third signal. The decoder 450 preferably has a first portion 423 for decoding the satellite signals including a first satellite demodulator 404 and corresponding synchronization detector 406, variable delay buffer 408, and demultiplexer 410 and a second satellite demodulator 414 and corresponding synchronization detector 416, variable delay buffer 418, and demultiplexer 420. The decoder 450 also preferably has a second portion 431 for decoding the terrestrial signals including a terrestrial demodulator 424, and corresponding synchronization detector 426, variable delay buffer 428, and demultiplexer 430. The second decoder portion 431 further preferably decodes a unique transmitter or area identification number from the third signal using detector 425. The receiver unit 400 also preferably comprises a counter (preferably within a decoder 412) for measuring a first delay between the first synchronization pulse and the second synchronization pulse and for measuring a second delay between one of the first synchronization pulse or the second synchronization pulse and the third synchronization pulse. The counter preferably measures a number of 23.92 Megahertz clock cycles to determine the first delay. The receiver unit 400 should also comprise a processor or controller 421 for determining an east-west constant delay line based on the first delay and for determining a north-south constant delay line based on the second delay. The processor 421 should further determine the east-west constant delay line based on whether the receiver unit received the first signal first or the second signal first. The signals from the respective demultiplexers 410, 420 and optionally 430 are preferably combined in the diversity combiner 422 to provide an output that can be displayed via display 435 or amplified via amplifier 432 and audibly played through speaker 434. If the receiver unit 400 is coupled to an optional transmitter 436, then the location information determined can be relayed to a third party as needed.

The Receiver may also optionally include a highly accurate internal or local clock 413 that may further optionally include a means for automatically synchronizing or updating itself to a locally broadcast time standard. The Receiver may also optionally include a means for deriving time from terrestrial cellular signals by connecting to a time server via a data connection and adjusting for the transmission delay. For example, a time signal maintained on an internet website can be transmitted via a cellular system to the receiver which would further account for any transmission delay through the cellular system in order to provide a fairly accurate local clock at the receiver.

Referring to FIG. 5, a series of timing diagrams are shown of the synchronization pulse output from a first satellite transmission source, a second satellite transmission source, and a terrestrial transmission source. The timing diagrams of FIG. 5 also show the time difference in synchronization pulses between the first and second satellite and the time difference is synchronization pulses between the first satellite and the terrestrial source.

Referring to FIG. 6, channel decoder radio location registers are illustrated in accordance with the present invention. In the "sat_early" register, one register location can indicate whether the first satellite or the second satellite synchronization signal was received first at the receiver unit. If the signal from the first satellite arrives early or the signals from both satellites arrive simultaneously, a "0" is placed in the designated register location. Otherwise, a "1" is placed in the designated register. In the "t_diff_sat" and "t_diff_terr" registers, representations of various possible conditions are given in hexadecimal format respectively for the time difference in synchronization pulses between the first and second satellite and the time difference in synchronization pulses between the first satellite and the terrestrial source.

Referring to FIG. 7, a flow chart illustrating a method 700 of determining location at a receiver in a communication system is shown. The communication system preferably has at least a first and a second satellite transmission source and at least a first terrestrial transmission source in communication with at least the first or the second satellite transmission source. The method preferably comprises the step of receiving a first synchronization pulse from the first satellite transmission source and receiving a second synchronization pulse from the second satellite transmission source at step 702 and further measuring at step 704 a time difference between the first synchronization pulse and the second synchronization pulse. Alternatively, at step 706, the receiver receives a third synchronization pulse from a terrestrial source. At step 708, a time difference between the first synchronization pulse and the second synchronization pulse is measured. At step 710, a substantial longitudinal line (or a first or east-west constant delay line) based on which synchronization pulse between the first and second synchronization pulse is received first at the receiver and the time difference measured at step 708. Although the foregoing are basic steps in the present invention, there are many variations within the scope and spirit of the claim invention of which only a few will be described herein. For instance, at step 712 a time delay between synchronization pulses among one of the satellite transmission sources and at least one terrestrial transmission source is measured, wherein the measurement can be taken several times and averaged to obtain better accuracy. Additionally, at step 714 a substantial latitudinal line (or a second or north-south constant delay line) based on the time delay between the satellite transmission and the terrestrial transmission sources is determined. At step 716, data received at the receiver can be filtered based on the substantial longitudinal line and/or the substantial latitudinal line determined. In another alternative at step 718, a area can be determined based on a unique transmitter identification (ID) number transmitted by at least a first terrestrial transmission source and optionally cross-secting the area with the substantial longitudinal line or the substantial latitudinal line (or both) for better accuracy. In the event no service is currently received from a first terrestrial transmission source at step 720, then the area closest to the last received unique transmitter ID number can be used. Additionally, when transmitter ID numbers are available, data can be filtered at the receiver based on the substantial longitudinal line and the unique transmitter ID number at step 722. This invention is easily applicable and adaptable to non-geostationary satellite systems (such as the system proposed by Sirius, Inc.) by using a time stamp during receipt of a first synchronization signal and the receipt of a second synchronization signal for determining location as shown in step 724.

What is claimed is:

1. A method of determining location at a receiver in a communication system having at least a first and a second satellite transmission source and at least a first terrestrial transmission source in communication with at least the first or the second satellite transmission source, comprising the steps of:

receiving a first synchronization pulse from the first satellite transmission source and receiving a second synchronization pulse from the second satellite transmission source;

measuring a time difference between the first synchronization pulse and the second synchronization pulse; and determining a substantial longitudinal line based on which synchronization pulse between the first and second synchronization pulse is received first at the receiver and the time difference measured.

2. The method of claim 1, wherein the method further comprises the step of measuring a time delay between synchronization pulses from at least one of the first or second satellite transmission sources and the at least one terrestrial transmission source.

3. The method of claim 2, wherein the method further comprises the step of determining a substantial latitudinal line based on the time delay between signals from the satellite and terrestrial transmission sources.

4. The method of claim 3, wherein the method further comprises the step of cross-secting the substantial longitudinal line with the substantial latitudinal line to determine a location.

5. The method of claim 2, wherein the method further comprises measuring the difference between several synchronization pulses between the satellite and terrestrial transmission sources and averaging the difference to obtain better accuracy.

6. The method of claim 1, wherein the method further determines an area based on a unique transmitter identification number transmitted by the at least first terrestrial transmission source.

7. The method of claim 1, wherein the method further comprises the step of filtering data received at the receiver based on the substantial longitudinal line determined.

8. The method of claim 2, wherein the method further comprises the step of filtering data received at the receiver based on the substantial longitudinal line and the substantial latitudinal line determined.

9. The method of claim 6, wherein the method further comprises the step of filtering data received at the receiver based on the substantial longitudinal line and the unique transmitter identification number.

10. The method of claim 1, wherein the step of determining further comprises the step of using a time stamp during a receipt of the first synchronization signal and a receipt of the second synchronization signal.

11. A receiver unit capable of determining its approximate location using at least a first and a second satellite transmission source and, if available, at least a first terrestrial transmission source, comprising:

a receiver for receiving a first signal from the first satellite transmission source, a second signal from the second satellite transmission source, and a third signal from the at least first terrestrial transmission source;

a decoder for decoding a first synchronization pulse from the first signal, a second synchronization pulse from the second signal, and a third synchronization pulse from the third signal;

a counter for measuring a first delay between the first synchronization pulse and the second synchronization pulse and for measuring a second delay between one of the first synchronization pulse or the second synchronization pulse and the third synchronization pulse;

a processor for determining an first constant delay line based on the first delay and for determining a second constant delay line based on the second delay.

12. A satellite and terrestrial based location system, comprising:

at least a first satellite and a second satellite, transmitting a first signal containing a first synchronization pulse and a second signal containing a second synchronization pulse respectively;

at least a first terrestrial repeater for receiving at least the first signal or the second signal, wherein the first terrestrial repeater transmits a third synchronization pulse; and at least a receiver unit, wherein the receiver unit comprises:

a receiver for receiving the first signal, the second signal, and the third signal;

a decoder for decoding the first synchronization pulse from the first signal, the second synchronization pulse from the second signal, and the third synchronization pulse from the third signal;

a counter for measuring a first delay between the first synchronization pulse and the second synchronization pulse and for measuring a second delay between one of the first synchronization pulse or the second synchronization pulse and the third synchronization pulse;

a processor for determining an first constant delay line based on the first delay and for determining a second constant delay line based on the second delay.

13. A satellite and terrestrial based location system comprising:

at least a first satellite and a second satellite, transmitting a first signal containing a first synchronization pulse including a time stamp indicating a time of transmission of the first signal and a second signal containing a second synchronization pulse;

an accurate clock in a receiver, wherein the accuracy of the accurate clock is sufficient to determine the delay between the synchronization pulse from the first satellite and a time reference from the accurate clock determined at the receiver.

14. The system of claim 13, wherein the accurate clock is an internal time reference at the receiver that receives updates using a local terrestrially originating broadcast time standard.

15. A receiver unit, comprising:

a receiver for receiving a first signal and a second signal;

a decoder for decoding a first synchronization pulse from the first signal, a second synchronization pulse from the second signal;

an accurate local clock coupled to the receiver;

a counter for measuring a first delay between the first synchronization pulse and the second synchronization pulse and for measuring a second delay between one of the first synchronization pulse or the second synchronization pulse and a time reference obtained from the accurate local clock; and a processor for determining an first constant delay line based on the first delay and for determining a second constant delay line based on the second delay.

16. The receiver unit of claim 15, wherein the accurate local clock is updated with a signal from a terrestrial transmission source.

17. A method of determining location at a receiver in a communication system having at least a first and a second satellite transmission source and optionally a first terrestrial transmission source in communication with at least the first or the second satellite transmission source, comprising the steps of:

receiving a first synchronization pulse from the first satellite transmission source at the receiver and receiving a second synchronization pulse from the second satellite transmission source at the receiver;

measuring a time difference between the first synchronization pulse and the second synchronization pulse; and determining an approximate location based on which synchronization pulse between the first and second synchronization pulse is received first at the receiver.

18. A receiver unit, comprising:

a receiver for receiving at least one among a first signal from a first satellite transmission source, a second signal from a second satellite transmission source, and a third signal from at least a first terrestrial transmission source;

a decoder for decoding a first synchronization pulse from the first signal, a second synchronization pulse from the second signal, and a third synchronization pulse from the third signal;

a counter for measuring a first delay between the first synchronization pulse and the second synchronization pulse and for measuring a second delay between one of the first synchronization pulse or the second synchronization pulse and the third synchronization pulse;

a processor for determining an approximate location based on at least one among the first delay and the second delay.

19. A receiver capable of determining location operating in a communication system having at least a first and a second satellite transmission source and at least a first terrestrial transmission source, comprising the steps of:

a receiver for receiving a first synchronization pulse from the first satellite transmission source and receiving a second synchronization pulse from the second satellite transmission source; and a processor coupled to the receiver, wherein the processor is programmed to:

measure a time difference between the first synchronization pulsed and the second synchronization pulse; and determining an approximate location based on which synchronization pulse between the first and second synchronization pulse is received first at the receiver and the time difference measured.

20. A satellite and terrestrial based location system comprising:

at least a first satellite and a second satellite, transmitting a first signal containing a first synchronization pulse and a second signal containing a second synchronization pulse;

an accurate clock in a receiver, wherein the accuracy of the accurate clock is sufficient to determine the delay between the synchronization pulse from the first satellite and a time reference form the accurate clock determined at the receiver.

21. A receiver unit capable of determining location operating in a communication system having at least a first and second satellite transmission source, comprising the steps of:

a receiver for receiving a first synchronization pulse from the first satellite transmission source and receiving a second synchronization pulse from the second satellite transmission source; and a processor coupled to the receiver, wherein the processor is programmed to:

measure a time difference between the first synchronization pulse and the second synchronization pulse; and determine an approximate location based on the time difference measured.

* * * * *